(12) United States Patent
Ai et al.

(10) Patent No.: US 9,424,103 B2
(45) Date of Patent: Aug. 23, 2016

(54) ADAPTIVE LOCK FOR A COMPUTING SYSTEM HAVING MULTIPLE RUNTIME ENVIRONMENTS AND MULTIPLE PROCESSING UNITS

(71) Applicant: Hong Kong Applied Science and Technology Research Institute Company Limited, Hong Kong (HK)

(72) Inventors: Yi Ai, Shenzhen (CN); Lin Xu, Hong Kong (HK); Jianchao Lu, Hong Kong (HK); Shaohua Zhang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 93 days.

(21) Appl. No.: 14/501,026

(22) Filed: Sep. 30, 2014

(65) Prior Publication Data

US 2016/0092280 A1  Mar. 31, 2016

(51) Int. Cl.
*G06F 9/44* (2006.01)
*G06F 9/45* (2006.01)
(Continued)

(52) U.S. Cl.
CPC ...... *G06F 9/52* (2013.01); *G06F 8/314* (2013.01); *G06F 8/45* (2013.01); *G06F 8/456* (2013.01); *G06F 9/5066* (2013.01)

(58) Field of Classification Search
CPC ........... G06F 8/314; G06F 8/45; G06F 8/456; G06F 9/5066
See application file for complete search history.

(56) References Cited

U.S. PATENT DOCUMENTS 7,373,640 B1 * 5/2008 English .................. G06F 8/456
717/149

7,594,234 B1 * 9/2009 Dice ....................... G06F 9/526
718/100
(Continued)

FOREIGN PATENT DOCUMENTS

CN    103946827 A    7/2014
WO   WO2013078962 A1   6/2013

OTHER PUBLICATIONS

Weng et al., "Dynamic Adaptive Scheduling for Virtual Machines", Jun. 2011, ACM, pp. 239-250; <http://dl.acm.org/citation.cfm?id=1996163&CFID=804789808&CFTOKEN=19243874>.*
(Continued)

*Primary Examiner* — Thuy Dao
*Assistant Examiner* — Ben C Wang
(74) *Attorney, Agent, or Firm* — Ella Cheong Hong Kong; Sam T. Yip (57) ABSTRACT

A method for operating a lock in a computing system having plural processing units and running under multiple runtime environments is provided. When a requester thread attempts to acquire the lock while the lock is held by a holder thread, determine whether the holder thread is suspendable or non-suspendable. If the holder thread is non-suspendable, put the requester thread in a spin state regardless of whether the requester thread is suspendable or non-suspendable; otherwise determines whether the requester thread is suspendable or non-suspendable unless the requester thread quits acquiring the lock. If the requester thread is non-suspendable, arrange the requester thread to attempt acquiring the lock again; otherwise add the requester thread to a wait queue as an additional suspended thread. Suspended threads stored in the wait queue are allowable to be resumed later for lock acquisition. The method is applicable for the computing system with a multicore processor.

20 Claims, 6 Drawing Sheets

(51) Int. Cl.
*G06F 9/52* (2006.01)
*G06F 9/50* (2006.01)

(56) References Cited

U.S. PATENT DOCUMENTS

| | | | | |
|---|---|---|---|---|
| 8,006,227 B2* | 8/2011 | Callahan | ............... | G06F 8/314 717/110 |
| 8,341,643 B2* | 12/2012 | Fulton | ............... | G06F 9/526 719/312 |
| 8,549,499 B1* | 10/2013 | Ding | ............... | G06F 8/456 717/149 |
| 8,701,111 B2* | 4/2014 | Fontenot | ............... | G06F 9/526 718/100 |
| 2005/0080981 A1* | 4/2005 | Archambault | ........ | G06F 9/5066 711/1 |
| 2006/0230411 A1* | 10/2006 | Richter | ............... | G06F 9/526 719/328 |
| 2007/0101333 A1 | 5/2007 | Mewhinney | | |
| 2008/0120490 A1* | 5/2008 | Brown | ............... | G06F 8/3135 712/216 |
| 2009/0125882 A1* | 5/2009 | Frigo | ............... | G06F 8/314 717/116 |
| 2009/0307655 A1* | 12/2009 | Pingali | ............... | G06F 8/456 717/106 |
| 2011/0239219 A1* | 9/2011 | Fulton | ............... | G06F 9/526 718/103 |
| 2012/0246654 A1* | 9/2012 | Eichenberger | ........ | G06F 9/5066 718/102 |
| 2014/0137130 A1* | 5/2014 | Jacob | ............... | G06F 9/46 718/103 |
| 2015/0205646 A1* | 7/2015 | Singh | ............... | G06F 9/526 718/106 |
| 2015/0254113 A1* | 9/2015 | Chiang | ............... | G06F 9/526 718/102 |

OTHER PUBLICATIONS

Kang et al., "Design and Development of a Run-Time Monitor for Multi-Core Architectures in Cloud Computing", Mar. 2011, Sensors, pp. 3595-3610; <www.mdpi.com/1424-8220/11/4/3595/pdf>.*
Al-Hakeem et al., "Adaptive Scheduling for Staged Applications: The Case of Multiple Processing Units", 2010, IEEE, pp. 51-60; <http://ieeexplore.ieee.org/stamp/stamp.jsp?tp=&arnumber=5476809>.*
First Office Action with Search Report of CN201410520410.9 issued by the State Intellectual Property Office of China on Jun. 3, 2016.

* cited by examiner

ADAPTIVE LOCK FOR A COMPUTING SYSTEM HAVING MULTIPLE RUNTIME ENVIRONMENTS AND MULTIPLE PROCESSING UNITS

FIELD OF THE INVENTION

The present invention relates generally to accessibility control of a shared resource in a computing system. In particular, the present invention relates to an accessibility-control technique for a computing system deploying multiple processing units and running under multiple runtime environments.

BACKGROUND

A multicore processor is a single computing component with two or more independent processing units, which are also known as "cores." A multicore computing system is usually used to run multiple threads in parallel with other resources, e.g., memory blocks, shared among different threads running on different cores. Of particular importance, multicore computing systems are advantageous in realizing embedded systems for a number of industrial applications. For example, a multicore computing system is usable in building a high-performance access gateway for a mobile communication system. Advantageously, the high-performance access gateway can be implemented by dedicating certain cores to process a majority of data packets outside an operating system (OS) environment (i.e. bypassing the OS) so as to achieve a high system throughput and a low latency, whereas remaining packets that require complex processing are forwarded to an OS networking stack and processed by other cores for performing necessary signaling and control functions. As such, it is advantageous that one thread is executed under a runtime environment specific to this thread and another thread runs on another optimized runtime environment. A runtime environment is characterized by, for example, the OS on which a thread is executed, the memory address space mapping, the input-output (TO) resources that can be used by the thread, whether or not the thread is tied to one particular core for execution, etc.

Owing to the presence of multiple runtime environments, a thread is classifiable into a suspendable thread or a non-suspendable thread. The suspendable thread is schedulable by an OS dispatcher whereas the non-suspendable thread is not and its execution cannot be suspended. A lock is usually used in the computing system to synchronize access to one or more shared resources by different threads. It is desirable to have a technique to operate the lock in the presence of suspendable and non-suspendable threads for a multicore computing system. However, most of existing techniques, such as the ones disclosed in US2007101333 and WO2013078962, are mainly engineered for suspendable threads without considering the presence of non-suspendable threads occurred in multiple runtime environments.

There is a need in the art for a technique to operate the lock in the presence of suspendable and non-suspendable threads arisen from multiple runtime environments.

SUMMARY OF THE INVENTION

The present invention provides a method for operating a lock in a computing system having plural processing units, where the lock is acquirable and releasable by plural threads generated in the computing system and each of the threads is either suspendable or non-suspendable. The method is described as follows.

In response to a lock-acquiring attempt made by a requester thread among the plural threads when the lock is held by a holder thread among the plural threads, a first processing unit that is assigned to execute the requester thread determines whether the holder thread is suspendable or non-suspendable. If the holder thread is determined to be non-suspendable, the first processing unit configures the requester thread to be in a spin state regardless of whether the requester thread is suspendable or non-suspendable, wherein the spin state is characterized by the requester thread continually making the lock-acquiring attempt and the first processing unit checking whether the attempt is successful. If the holder thread is determined to be suspendable, it is preferable that the first processing unit determines whether the requester thread is suspendable or non-suspendable unless the requester thread quits acquiring the lock. If the requester thread is determined to be non-suspendable, the first processing unit arranges the requester thread to make the lock-acquiring attempt again. Otherwise, the first processing unit adds the requester thread to a wait queue as an additional suspended thread. The wait queue is configured to store plural suspended threads that are allowable to be resumed by one of the plural processing units.

When the holder thread releases the lock, a lock-release procedure is performed by one of the plural processing units. Preferably, the lock-release procedure comprises: if the wait queue has one or more suspended threads, selecting one suspended thread from the wait queue, and resuming this selected suspended thread so that this resumed thread is rearranged to acquire the lock.

Other aspects of the present invention are disclosed as illustrated by the embodiments hereinafter.

DETAILED DESCRIPTION

Figure 1:
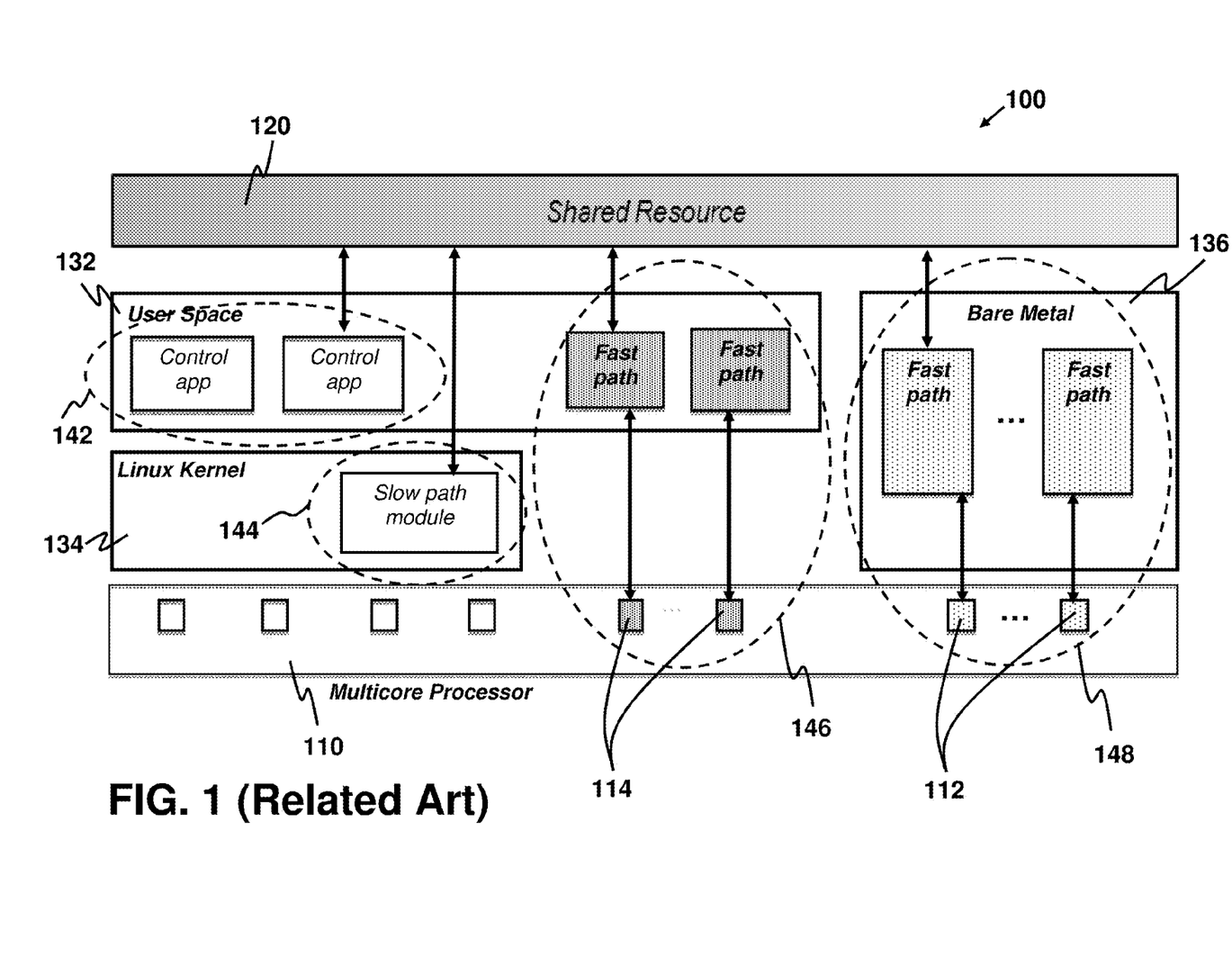
FIG. 1 depicts a schematic diagram showing a typical multicore computing system having multiple runtime environments, illustrating the occurrence of suspendable and non-suspendable threads accessing a shared resource.

The Inventors have made the following observations that lead to the present invention. FIG. 1 is an example of a typical scenario depicting the occurrence of suspendable and non-suspendable threads in the presence of multiple runtime environments and multiple processing units. The scenario depicted in FIG. 1 resembles the one for a high-performance access gateway.

A computing system 100 comprises a multicore processor 110 and a shared resource 120. Plural threads contending for the shared resource 120 are generated in the computing system 100 at different spaces including a user space 132, a Linux kernel 134 and a "bare metal" space 136. A bare-metal thread is a thread generated in the bare metal space 136. As used herein, a bare-metal thread is a thread that does not involve an OS during execution and does not contain any instruction invoking any function of the OS. Bare-metal threads 148 are tied to selected processing units 112 in the multicore processor 110, and are in general optimized for a high execution speed so that "fast paths" are assigned to connect the selected processing units 112 and the shared resource 120. The bare-metal threads 148 are non-suspendable; otherwise the execution speed would be compromised. On the other hand, Linux kernel threads 144 generated in the Linux kernel 134 are not tied to specific processing units and are suspendable. "Slow paths" may be assigned to the Linux kernel threads 144. In the user space 132, threads generated therein may be fast-path connections or slow-path connections. Linux normal user threads 142 not bound to any specific processing units of the multicore processor 110 are suspendable. For some high-speed application, a user of the computing system 100 may develop high-speed user threads 146 that require fast-path connections. These high-speed user threads 146 are bound to specific processing units 114 and are configured to bypass OS kernels during execution. The high-speed user threads 146 are non-suspendable due to bypassing the OS kernels.

An efficient strategy to operate a lock for accessibility control of a shared resource is developed as follows. Consider that the lock is held by a holder thread while a requester thread makes an attempt to acquire the lock. If the holder thread is non-suspendable, it usually implies a high-speed execution so that the shared resource held by the holder thread is possible to be released in a short time. The requester thread may advantageously continue to monitor the lock until it is released, and it is done without a need to consider whether the requester thread is suspendable or non-suspendable. If the holder thread is suspendable, in view of the possibility that the lock may not be released in a short time, the requester thread may have an option to quit acquiring the lock and do something else. If, in addition, the requester thread is non-suspendable, the requester thread may continually monitor the lock in case the requester thread decides not to quit acquiring the lock. If both the requester thread and the holder thread are suspendable, it is advantageous to suspend the requester thread and put it into a wait queue so that the processing unit that executes the requester thread can be freed and is allowed to execute other threads. The aforementioned strategy is used to develop the present invention as follows.

An aspect of the present invention is to provide a method for operating a lock in a computing system having plural processing units. The lock is acquirable and releasable by plural threads generated in the computing system. Each of the threads is either suspendable or non-suspendable. The method is exemplarily illustrated as follows with the aid of FIG. 2.

Figure 2:
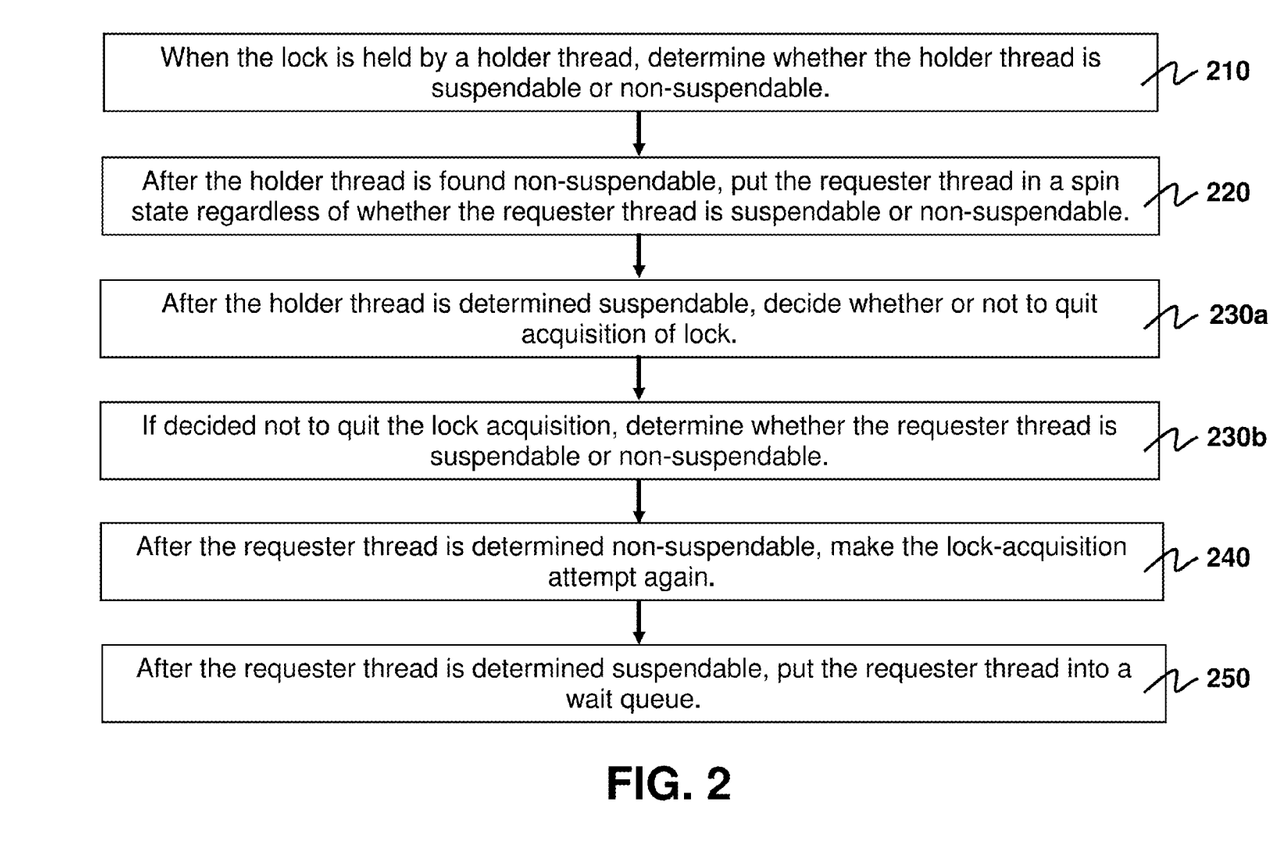
FIG. 2 is a flowchart showing a method for operating a lock according to an exemplary embodiment of the present invention.

For a requester thread and a holder thread among the plural threads, consider that the requester thread makes an attempt to acquire the lock while the lock is held by the holder thread. Consider that a first processing unit among the plural processing units is assigned to execute the requester thread. When it is detected that the lock is held by the holder thread, the first processing unit determines whether the holder thread is suspendable or non-suspendable regardless of whether the requester thread is suspendable or non-suspendable (step 210), so that there is no need for the first processing unit to consider if the requester thread is suspendable or non-suspendable. If the holder thread is determined to be non-suspendable, the first processing unit configures the requester thread to be in a spin state (step 220) where the spin state is characterized by the requester thread continually making the lock-acquiring attempt and the first processing unit checking whether the attempt is successful. That is, the spin state is such that the first processing unit is engaged in a loop of continually making the lock-acquiring attempt until the attempt is successful. If the holder thread is found to be suspendable, it is preferable that the first processing unit decides whether or not to quit acquiring the lock (step 230a). If it is decided not to quit the acquisition attempt, it is also preferable that the first processing unit determines whether the requester thread is suspendable or non-suspendable (step 230b). After the requester thread is determined to be non-suspendable, the first processing unit arranges the requester thread to make the lock-acquiring attempt again (step 240). If, on the other hand, the requester thread is determined to be suspendable, the first processing unit adds the requester thread to a wait queue as an additional suspended thread (step 250). The wait queue is configured to store plural suspended threads that are allowable to be resumed by one of the plural processing units.

When the holder thread releases the lock, a lock-release procedure is performed by one of the plural processing units as determined by the computing system. In one embodiment, the lock-release procedure includes determination of whether the wait queue has one or more suspended threads, i.e. whether the wait queue is not empty. If it is determined that the wait queue is not empty, one suspended thread is selected from the wait queue. This selected thread is resumed so that the resumed thread is re-arranged to acquire the lock.

In one option, the computing system is configured such that the lock-release procedure is performed only when the holder thread is suspendable. Adopting this option is advantageous if it is not desired to slow down execution of non-suspendable threads, which may be, for example, related to certain critical tasks. Anyway, it is desirable to employ one or more measures to avoid the one or more suspended threads in the wait queue from remaining suspended without being resumed. The aforesaid one or more measures are known in the art and can be easily determined by a skilled person in the art.

In case that the lock is not held by any of the plural threads when the requester thread makes the lock-acquiring attempt, the first processing unit acquires the lock so that a shared resource corresponding to the lock becomes accessible by the requester thread.

Figure 3:
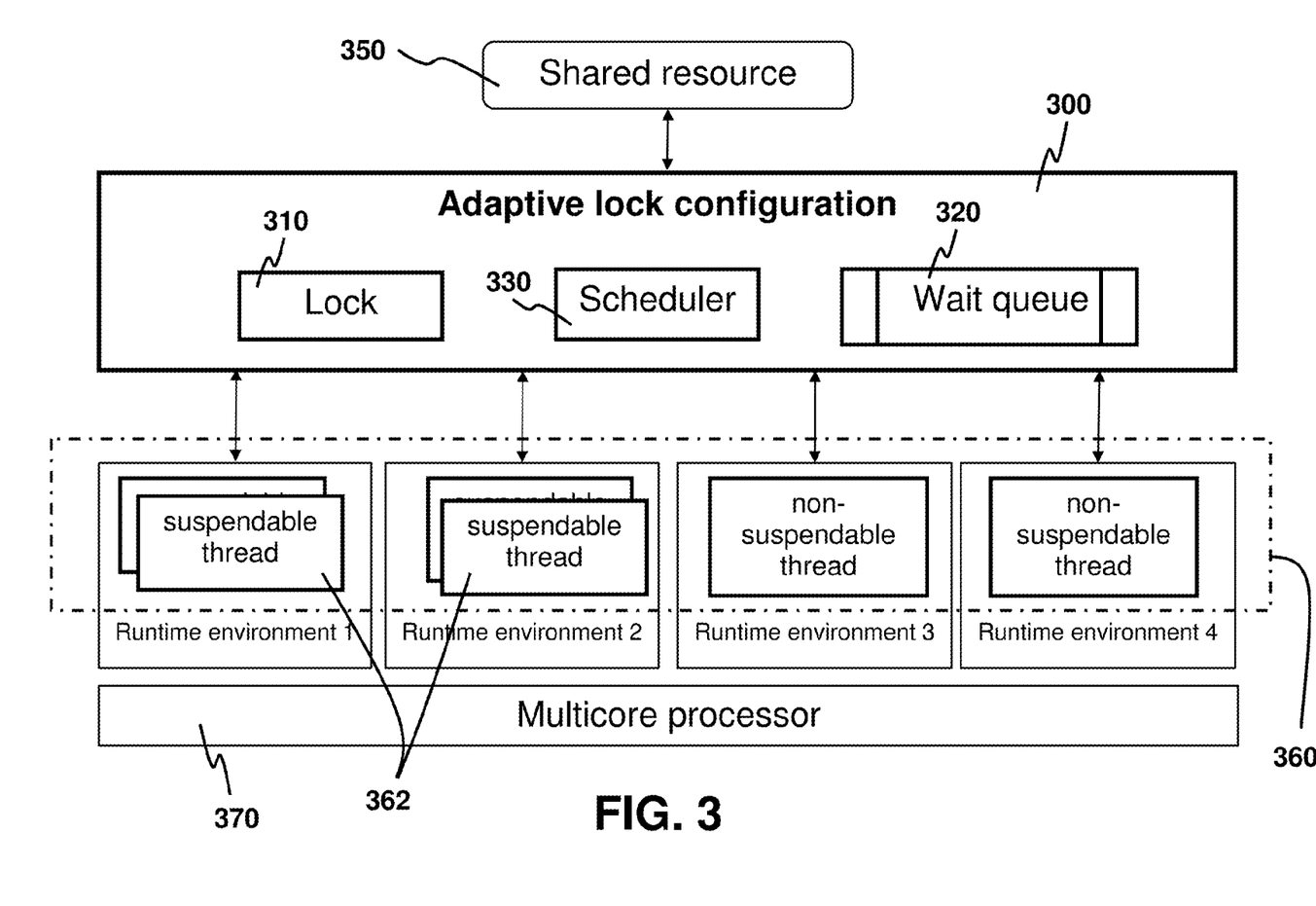
FIG. 3 depicts one implementation of an adaptive lock configuration as disclosed according to an embodiment of the present invention, the adaptive lock configuration including a lock, a scheduler and a wait queue.

The disclosed method is implementable as an adaptive lock configuration in the computing system. FIG. 3 depicts one implementation of the adaptive lock configuration. An adaptive lock configuration 300 comprises a lock 310, a scheduler 330 and a wait queue 320. The lock 310 controls access of threads 360 to a shared resource 350. The wait queue 320 keeps suspended threads that have failed to acquire the lock 310. The scheduler 330, which is usually configured to be operable by any one of processing units in a multicore processor 370, is used for scheduling suspendable threads 362 from a running state to a suspended state, or vice versa.

Figure 4:
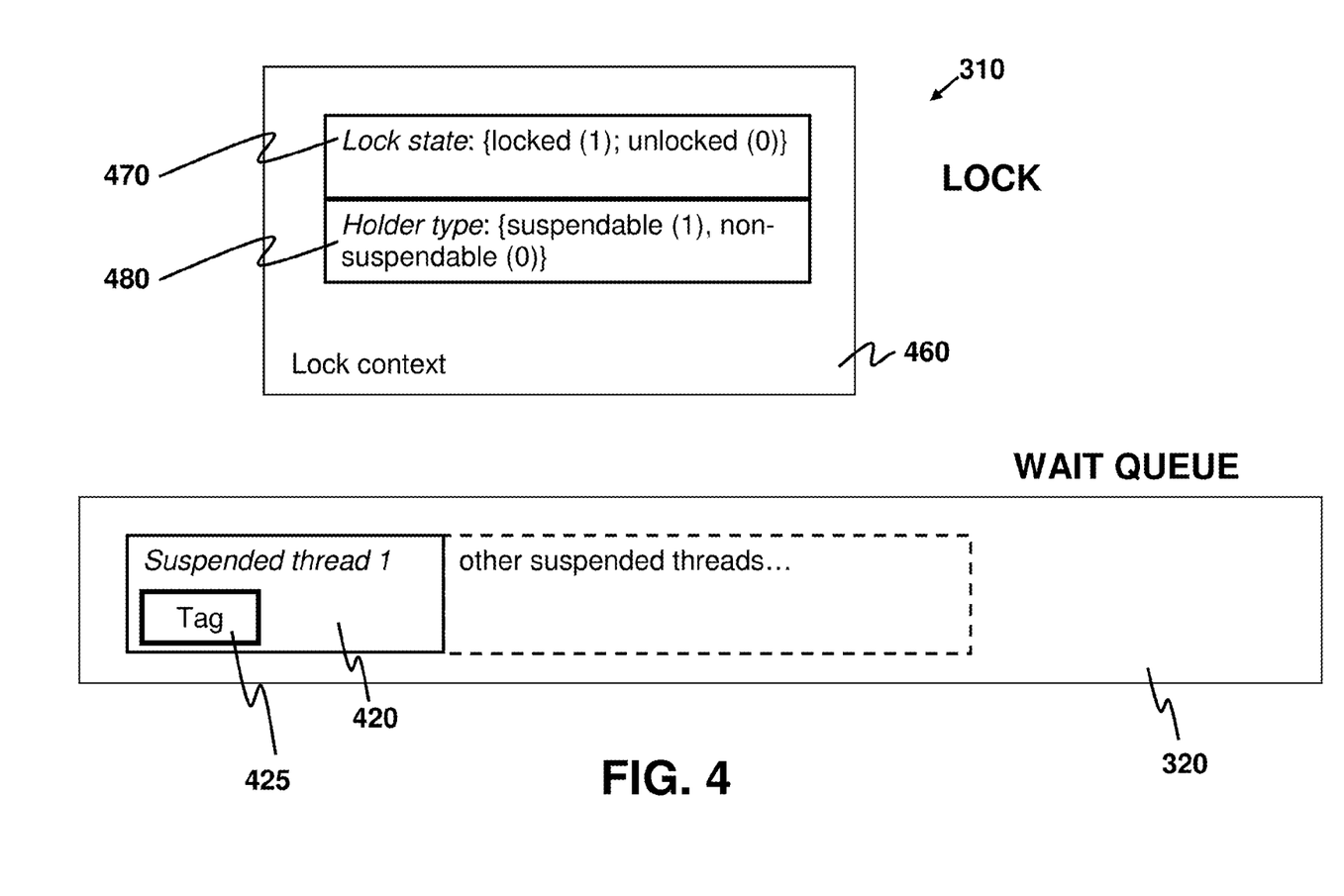
FIG. 4 depicts one realization of the lock and the wait queue of FIG. 3.

Example realizations of the lock 310 and of the wait queue 320 are shown in FIG. 4. The lock 310 is realized as a lock context 460 that is a data structure in a global shared memory block of the computing system. The global shared memory block is visible to the plural threads 360 and accessible by the plural processing units in the multicore processor 370. The lock context 460 includes a lock state 470 for indicating whether or not the lock 310 is held, and a holder type 480 for indicating whether the holder thread is suspendable or non-suspendable when the lock is held. The wait queue 320 is also implemented in the global shared memory block. In one embodiment, the wait queue 320 includes a tag 425 for each suspended thread 420 stored in the wait queue 320. The tag 425 indicates an order of arrival of the suspended thread 420 over all suspended threads stored in the wait queue 320. The tag 425 may be, for example, a time tag recording the clock time that the suspended thread entered into a suspended state. In another embodiment, the lock state 470 uses a value of 1 to indicate that the lock 310 is locked or already held by a holder thread, and a value of 0 to signify that the lock 310 is not yet acquired. If the lock 310 is already held by the holder thread, the holder type 480 uses values of 1 and 0 to indicate that the holder thread is suspendable and non-suspendable, respectively.

Figure 5:
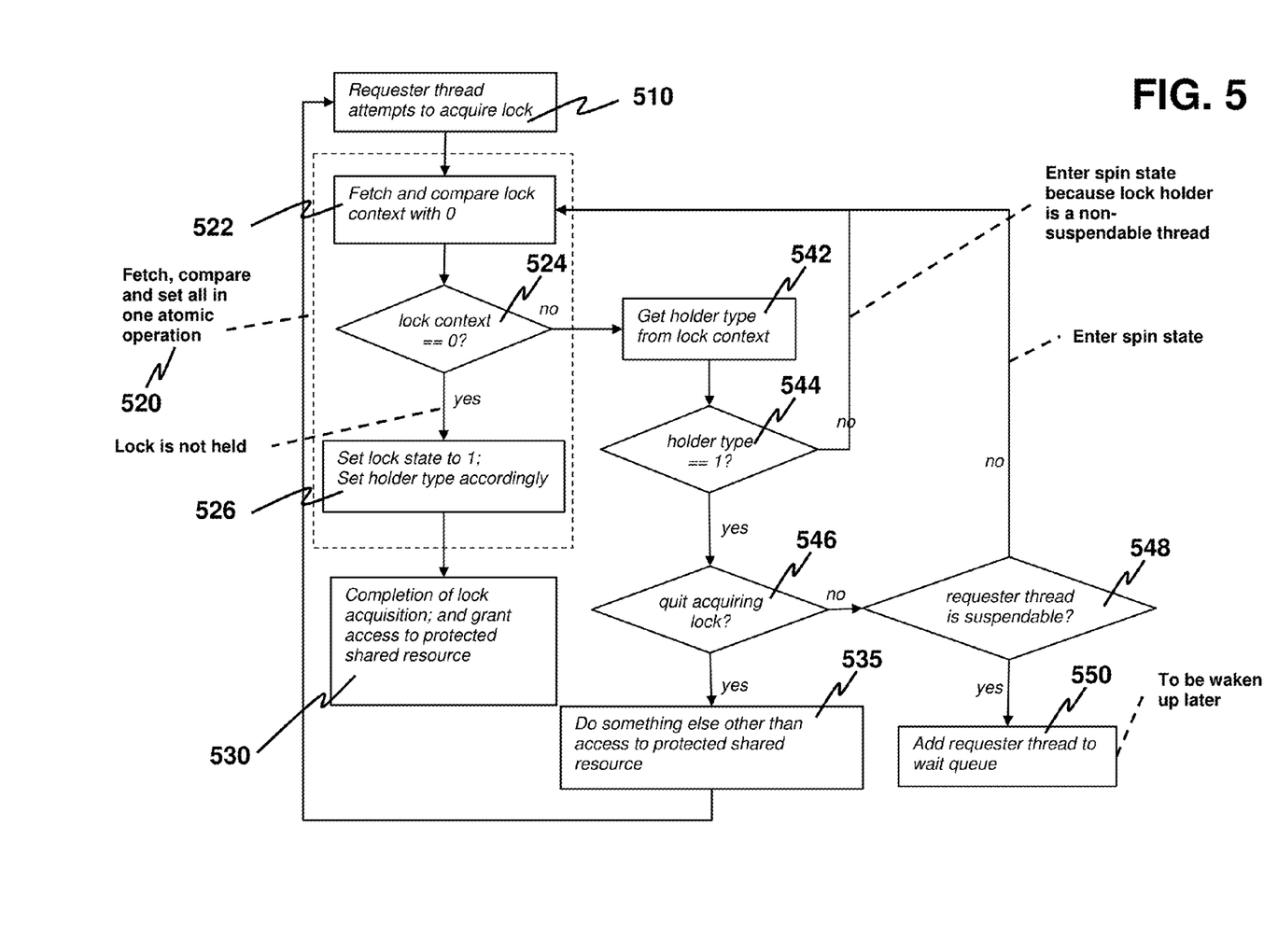
FIG. 5 is a flowchart illustrating a procedure of lock acquisition in accordance with an embodiment of the present invention.

FIG. 5 depicts, in accordance with one embodiment of the present invention, a flowchart showing a procedure of lock acquisition based on the arrangement of the lock context 460 shown in FIG. 4. A requester thread attempts to acquire a lock (step 510). The lock state's value is then obtained from the lock context that is fetched from the global shared memory block, and is compared with a pre-determined value of 0 (step 522) so as to determine whether the lock is held by any of the plural threads. If the lock state has a value of 0 (step 524), indicating that the lock is not held by any of the plural threads, then update the lock state to 1 and the holder type according to the type of the requester thread (step 526) in order that the requester thread acquires the lock. Afterwards, the lock acquisition is completed and access to a protected shared resource corresponding to the lock is granted to the requester thread (step 530). If the lock state has a value different from 0 (step 524), then the holder type is obtained from the lock context (step 542). If the holder type's value is not 1 (step 544), then repeat the step 522 such that the requester thread goes into a spin state, or else consider whether or not to quit the lock acquisition (step 546). If it is decided to quit acquiring the lock, then the requester thread performs something other than accessing the protected shared resource (step 535) and thereafter repeats the step 510. If it is decided not to quit acquiring the lock in the step 546, then check whether the requester thread is suspendable (step 548). If the requester thread is non-suspendable, then perform the step 522 so that the requester thread enters into the spin state; otherwise the requester thread is added to the wait queue (step 550) so that the requester thread becomes a suspended thread to be waken up later. In the steps 522 and 524, it is sometimes more efficient or more convenient to directly compare the lock context, instead of the lock state's value, with the pre-determined value. This situation arises when the lock context, which is a concatenation of the lock state and the holder type, is stored and is fetchable as one word. If, in an implementation, the lock context is compared with the pre-determined value of 0 as is shown in the step 524, then the lock context is required to be reset to a value of 0 at the time when the lock is released from a thread.

Preferably, the fetching of the lock context (the step 522), the comparing of the lock context with the pre-determined value (the steps 522, 524) and the updating of the lock state and the holder type (the step 526) are configured to be performed in one atomic operation (step 520) when it is determined that the lock is not held. By performing the step 520 in one atomic operation, it avoids a problem that the lock context is simultaneously accessed and updated by more-than-one processing units.

Figure 6:
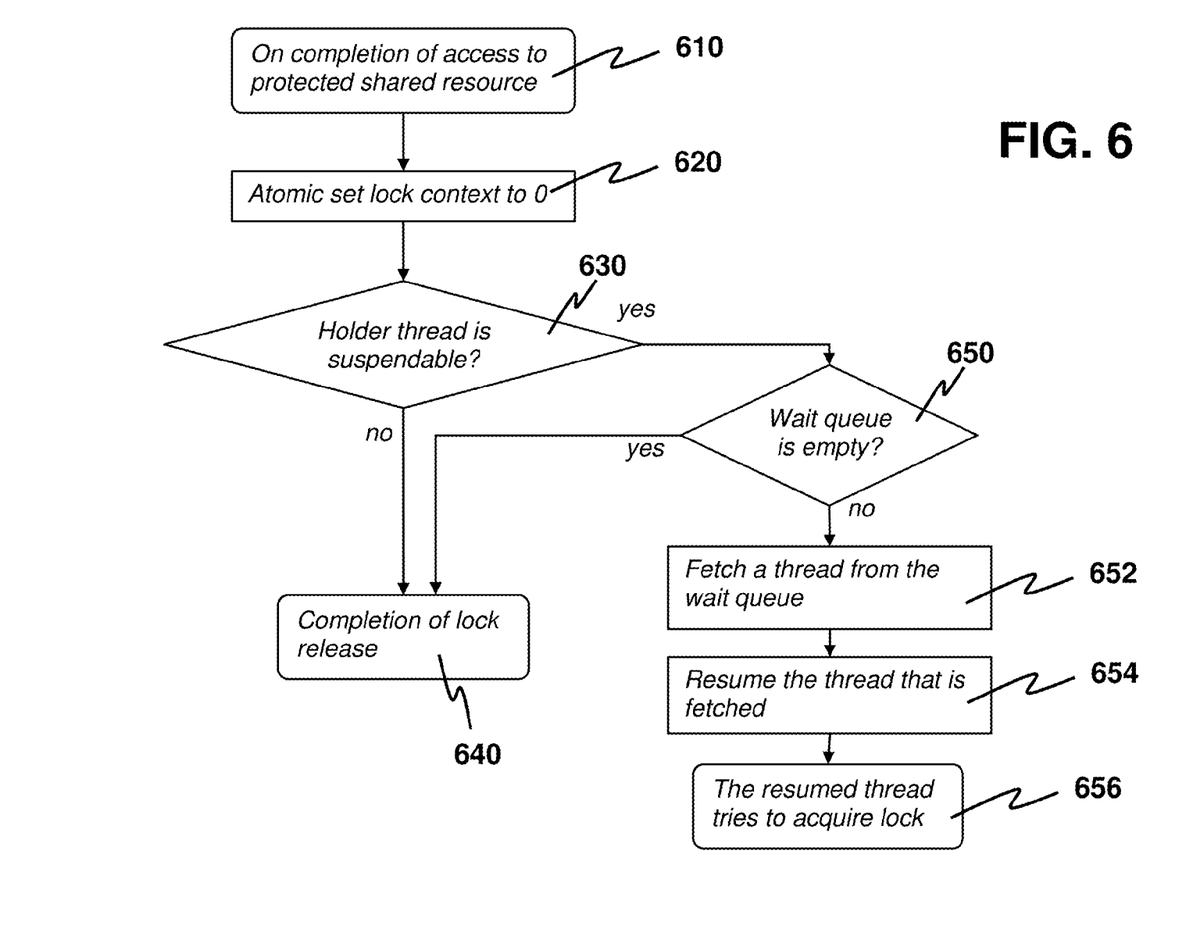
FIG. 6 is a flowchart illustrating a lock-release procedure in accordance with one embodiment of the present invention.

FIG. 6 depicts one realization of the lock-release procedure for the holder thread to perform based on the arrangement of the lock context 460 shown in FIG. 4. The holder thread determines that access to the protected shared resource has been completed (step 610). Then the lock context is set to 0 in one atomic operation (step 620) so that the lock state's value is set to zero. (The holder type's value is also set to zero as a result of setting the lock context to 0.) If the holder thread is non-suspendable (as determined in step 630), then the lock release is completed (step 640), or else check if the wait queue is empty (step 650). If the wait queue is empty, then the lock release is also completed (step 640). If not, a suspended thread is fetched from the wait queue (step 652), and is resumed for execution thereafter (step 654), triggering this resumed thread to attempt acquiring the lock (step 656).

A computing system using the disclosed method of operating a lock is realizable by including plural processing units and a global shared memory block. A portion of the global shared memory block is assignable to establish the lock for controlling accessibility of a shared resource in the computing system, where the lock is acquirable and releasable by plural threads that are generable in the computing system. Each of the threads is configured to be either suspendable or non-suspendable. The global shared memory block is configured to be visible to the plural threads and accessible by the plural processing units. In addition, the lock is configured to be operated according to the lock-operating method as set forth in any of the embodiments disclosed above.

The present invention is applicable to a computing system having plural processing units. In one practical implementation, the plural processing units are located in a multicore processor. Nevertheless, the present invention is not limited only for a multicore processor. For example, in one implementation of the computing system, part of, but not all of, the plural processing units are general-purpose cores of a multicore processor and the remaining processing units are special-purpose standalone processors such as a digital signal processor (DSP).

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for operating a lock in a computing system having plural processing units, the lock being acquirable and releasable by plural threads generated in the computing system where each of the threads is either suspendable or non-suspendable, the method comprising:

in response to a lock-acquiring attempt made by a requester thread among the plural threads when the lock is held by a holder thread among the plural threads, determining, by a first processing unit that is assigned to execute the requester thread, whether the holder thread is suspendable or non-suspendable;

when the first processing unit determines that the holder thread is non-suspendable, configuring, by the first processing unit, the requester thread to be in a spin state regardless of whether the requester thread is suspendable or non-suspendable, wherein the spin state is characterized by the requester thread continually making the lock-acquiring attempt and the first processing unit checking whether the attempt is successful;

when the first processing unit determines that the holder thread is suspendable, determining, by the first processing unit, whether the requester thread is suspendable or non-suspendable unless the requester thread quits acquiring the lock;

when the first processing unit determines that the requester thread is non-suspendable after the holder thread is determined to be suspendable, arranging, by the first processing unit, the requester thread to make the lock-acquiring attempt again; and when the first processing unit determines that the requester thread is suspendable after the holder thread is determined to be suspendable, adding, by the first processing unit, the requester thread to a wait queue as an additional suspended thread, wherein the wait queue is configured to store plural suspended threads that are allowable to be resumed by one of the plural processing units.

2. The method of claim 1, further comprising:
when the holder thread releases the lock, performing a lock-release procedure by one of the plural processing units wherein the lock-release procedure comprises:
  (a) if the wait queue has one or more suspended threads, selecting one suspended thread from the wait queue, and resuming this selected suspended thread so that this resumed thread is re-arranged to acquire the lock.

3. The method of claim 2, wherein the performing of the lock-release procedure is further configured such that the lock-release procedure is performed only when the holder thread is suspendable.

4. The method of claim 1, further comprising:
when the lock is not held by any of the plural threads and the requester thread makes the lock-acquiring attempt, acquiring, by the first processing unit, the lock so that a shared resource corresponding to the lock becomes accessible by the requester thread.

5. The method of claim 1, wherein:
the lock is realized as a lock context that is a data structure in a global shared memory block of the computing system, the global shared memory block being visible to the plural threads and accessible by the plural processing units; and
the wait queue is realized as another data structure in the global shared memory block.

6. The method of claim 5, wherein:
the lock context includes a lock state for indicating whether or not the lock is held, and a holder type for indicating whether the holder thread is suspendable or non-suspendable when the lock is held; and
the wait queue includes a tag for each of suspended threads stored in the wait queue, the tags for the suspended threads being configured such that an order of arrival of all the suspended threads in the wait queue is determinable.

7. The method of claim 6, further comprising:
fetching, by the first processing unit, the lock state's value from the lock context;
comparing, by the first processing unit, the fetched value of the lock state with a pre-determined value so as to determine whether the lock is held by any of the plural threads; and
when it is determined that the lock is not held by any of the plural threads, updating, by the first processing unit, the lock state and the holder type in order that the requester thread acquires the lock.

8. The method of claim 7, wherein the fetching of the lock state's value, the comparing of the fetched value with the pre-determined value and the updating of the lock state and the holder type are configured to be performed in one atomic operation when it is determined that the lock is not held.

9. A computing system comprising:
plural processing units; and
a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;
wherein the lock is configured to be operated according to the method of claim 1.

10. The computing system of claim 9, wherein the plural processing units are located in a multicore processor.

11. A computing system comprising:
plural processing units; and
a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;
wherein the lock is configured to be operated according to the method of claim 2.

12. The computing system of claim 11, wherein the plural processing units are located in a multicore processor.

13. A computing system comprising:
plural processing units; and
a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;
wherein the lock is configured to be operated according to the method of claim 5.

14. The computing system of claim 13, wherein the plural processing units are located in a multicore processor.

15. A computing system comprising:
plural processing units; and
a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;

wherein the lock is configured to be operated according to the method of claim 6.

16. The computing system of claim 15, wherein the plural processing units are located in a multicore processor.

17. A computing system comprising:
   plural processing units; and
   a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;

wherein the lock is configured to be operated according to the method of claim 7.

18. The computing system of claim 17, wherein the plural processing units are located in a multicore processor.

19. A method for operating a lock in a computing system having plural processing units, the lock being acquirable and releasable by plural threads generated in the computing system where each of the threads is either suspendable or non-suspendable, the method comprising:
   in response to a lock-acquiring attempt made by a requester thread among the plural threads when the lock is held by a holder thread among the plural threads, determining, by a first processing unit that is assigned to execute the requester thread, whether the holder thread is suspendable or non-suspendable;
   when the first processing unit determines that the holder thread is non-suspendable, configuring, by the first processing unit, the requester thread to be in a spin state regardless of whether the requester thread is suspendable or non-suspendable, wherein the spin state is characterized by the requester thread continually making the lock-acquiring attempt and the first processing unit checking whether the attempt is successful;
   when the first processing unit determines that the holder thread is suspendable, determining, by the first processing unit, whether the requester thread is suspendable or non-suspendable unless the requester thread quits acquiring the lock; and
   when the first processing unit determines that the requester thread is suspendable after the holder thread is determined to be suspendable, adding, by the first processing unit, the requester thread to a wait queue as an additional suspended thread, wherein the wait queue is configured to store plural suspended threads that are allowable to be resumed by one of the plural processing units.

20. A computing system comprising:
   plural processing units; and
   a global shared memory block, a portion of which is assignable to establish a lock for controlling accessibility of a shared resource in the computing system, the lock being acquirable and releasable by plural threads that are generable in the computing system, each of the threads being configured to be either suspendable or non-suspendable, the global shared memory block being configured to be visible to the plural threads and accessible by the plural processing units;

wherein the lock is configured to be operated according to the method of claim 19.

* * * * *